United States Patent Office 3,335,778
Patented Aug. 15, 1967

3,335,778
SEALING FLAP FOR PNEUMATIC TIRES
Arthur B. Blagden, Coventry, and George E. Adams, Kenilworth, England, assignors to Dunlop Rubber Company Limited, London, England, a corporation of Great Britain
Filed Apr. 12, 1965, Ser. No. 447,452
Claims priority, application Great Britain, Apr. 18, 1964, 16,175/64
8 Claims. (Cl. 152—366)

This invention relates to wheel and rim assemblies for pneumatic tires, and particularly to sealing flaps for use in assemblies which comprise an open-bellied tubeless pneumatic tire mounted on a non-airtight rim such as a rim fitted to a spoked cycle wheel or other such vehicles.

According to one aspect of the invention, a sealing flap for an open-bellied pneumatic tire comprises an annulus of rubber or plastic material for fitting around an associated wheel rim, the annulus having an axial cross-sectional profile which is of substantial thickness at the sides thereof to provide, in the assembled state of the flap on a rim, a pair of bead seats which are spaced radially outwardly at a substantial distance from associated seating portions of the rim, and the said profile being relatively thin in the central region thereof to form a central well in the said assembled state.

According to another aspect of the invention, a rim assembly comprises a rigid rim having a pair of tire bead retaining flanges and a flap of rubber or plastic material fitted around the rim, the flap having an axial cross-sectional profile which is of substantial thickness at the sides thereof to provide a pair of bead seats spaced radially outwardly at a substantial distance from the underlying seating portions of the rim, and the said profile being relatively thin in the central region thereof to form a central well.

The invention also provides a wheel assembly comprising a wheel having a rim provided with a sealing flap as defined above.

Four embodiments of the invention will now be described with reference to the accompanying drawings, in which.

Figure 1:
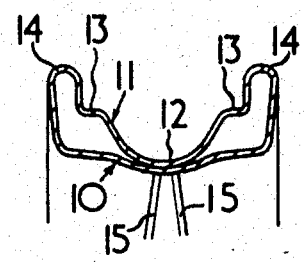
FIGURE 1 is a diagrammatic axial cross-sectional view of part of a conventional cycle wheel.

The cycle wheel 10 illustrated in FIGURE 1 is of a well-known type. The rim 11 of the wheel 10 comprises a central well 12 flanked by raised tire bead seating portions 13 and bead retaining flanges 14. Spokes 15 are attached adjacent the center line of the rim.

Figure 2:
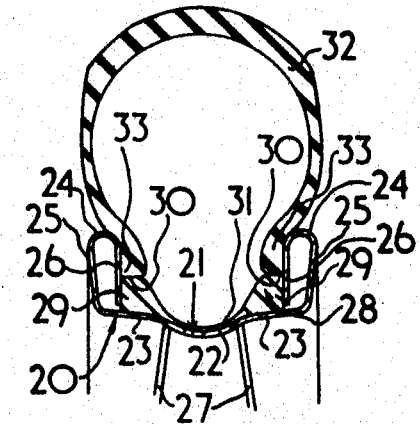
FIGURE 2 is a diagrammatic axial cross-sectional view of part of a cycle wheel and tire assembly in accordance with the invention.

A cycle wheel 20 in accordance with the invention is shown in FIGURE 2. The rim 21 is produced from a flat strip of sheet steel by circling the strip and welding its ends together to form a cylindrical blank, and rolling the blank between cooperating pairs of profiled rollers to shape the blank into a rim having the desired axial cross-sectional profile.

The finished rim 21 is provided with a circumferentially-extending well 22 in its central region flanked by seating portions 23 extending in a generally axial direction between the well and the tire bead retaining flanges 24. The axially outer sides of the flanges 24 are formed by turning the side portions 25 of the blank in a radially outwards direction, the outer parts of the radially-outwardly turned portions then being turned back radially inwardly to form the inner sides 26 of the flanges 24.

The rim is drilled in the usual manner to receive spokes 27 and a tire inflation valve adaptor (not shown).

The metal rim 21 thus formed has a central circumferential well 22 but is not provided with the usual bead-seats spaced at a substantially radial distance beyond the base of the well (see bead seats 13 in FIGURE 1). Instead, a rubber sealing flap 28 is fitted around the rim, the axial cross-sectional profile of the rubber flap being such as to provide bead-seating portions 30 at the required radial distance from the base of the well 22.

The rubber flap 28 is made from circled and joined extruded strip having a cross-section which is relatively thick in its side regions 29, to provide the bead-seating portions 30, and relatively thin in its central region 31 so that it will form a well which will fit closely within the well 22 formed in the metal rim and will not substantially increase the diameter of the well 22.

A tubeless pneumatic tire 32 is fitted to the wheel 20 with the tire beads 33 supported on the bead seats 30 provided by the thick side portions 29 of the rubber flap 28. The tire 32 is inflatable through an inflation valve (not shown) fitted into an adaptor secured to the flap, the flap 28 being arranged to seal the inflation chamber of the tire.

Figure 4:
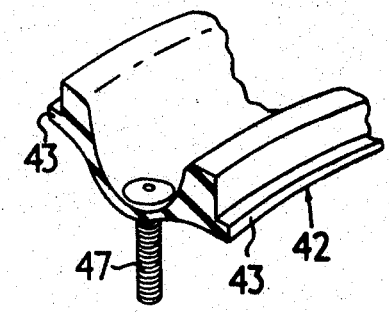
FIGURE 4 is a diagrammatic perspective view of part of the sealing flap shown in FIGURE 3.
Figure 3:
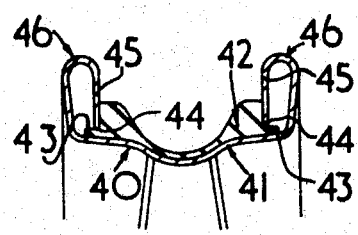
FIGURE 3 is a diagrammatic axial cross-sectional view of part of a cycle wheel incorporating a preferred form of sealing flap in accordance with the invention.

In the preferred construction shown in FIGURES 3 and 4, a wheel 40 of a similar kind to that shown in FIGURE 2 is provided with a rim 41 and a rubber sealing flap 42. The flap 42 is provided with a pair of axially outwardly projecting lips 43 which are engaged beneath the radially inner edges 44 of the axially inner sides 45 of the rim flanges 46, and an inflation valve adaptor 47 is secured to the flap as shown in FIGURE 4.

The engagement of the lips 43 beneath the edges 44 provides an effective means for preventing disturbance of the flap during removal and fitting of the associated tire.

Figure 5:
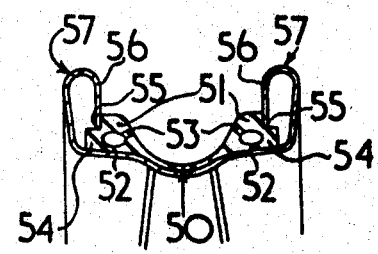
FIGURE 5 is a diagrammatic axial cross-sectional view of part of a cycle wheel incorporating an alternative form of sealing flap in accordance with the invention.

In FIGURE 5 a flap 50 is shown in which the relatively thick side portions 51 are each formed with a continuous internal annular cavity 52. The wall separating each cavity 52 from the inflation chamber of the associated tire may be perforated as indicated by references 53 to enable air pressure within the tire to be communicated to the interior of the cavities and thus to improve the rigidity of the side portions. Lips 54 serve to engage beneath the edges 55 of the inner walls 56 of the rim flanges 57 to hold the flap in position.

Figure 6:
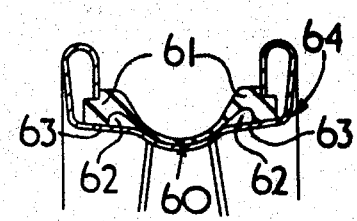
FIGURE 6 is a diagrammatic axial cross-sectional view of part of a cycle wheel incorporating a further alternative form of sealing flap in accordance with the invention.

In the arrangement shown in FIGURE 6 a flap 60 has relatively thick side portions 61 which have an arched profile adapted to provide cavities 62 between the side portions of the flap and the seating portions 63 of the associated wheel rim 64.

The sealing flap and rim construction described above have the advantage that they enable a tubeless tire 32 to be used on a spoked wheel, such as a cycle wheel, having a well-base rim.

Further, the complex cross-sectional profile of the rim assembly is provided partly by the metal rim and partly by the rubber flap. This results in a considerable simplification in the manufacture of the metal rim, enabling it to be produced more cheaply and easily than conventional rims in which the whole profile has to be formed by difficult and costly rolling operations on the metal blank. If desired, an inner tube of conventional form could be used in conjunction with the rubber flap; in this arrangement the flap would not need to provide a seal, but would still have the advantage that it would enable a relatively simple rim to be used.

An additional advantage in using a rim construction as described above is that the spokes can be located at points spaced at a substantial distance from the center line of the rim, thus providing a wheel of greater lateral stiffness. In the conventional bicycle wheel rim shown in FIGURE 1 of the drawings the profile is obtained by using a hollow-walled construction in the regions remote from the rim center line, and the relatively steep curvature of the radially outer wall makes it necessary to position the spokes closely adjacent to the center line. Although the present invention has been illustrated and described in connection with a few selective example embodiments it will be understood that these are illustrative of the invention and are by no means restrictive thereof. It is reasonably to be assumed that those skilled in the art can make numerous revisions and adaptations of the invention and it is intended that such revisions and variations will be included within the scope of the following claims.

Having now described our invention, what we claim is:

1. A sealing flap for an open-bellied pneumatic pressure containing tire comprising an impervious flexible annular member proportioned to fit around and lie sealingly against an associated wheel rim, said annular member having a substantial thickness at each of the opposite sides thereof to provide a pair of bead seats disposed radially outwardly at a substantial distance from the associated portions of the member engaged by said rim, a relatively thin cross section of said member which is adapted to lie against the central portion of the wheel rim to form a central region in sealing engagement with said wheel rim, and at least one axially projecting lip located along one of the side edges of said member for engagement with a coacting portion of the wheel rim.

2. The sealing flap and wheel rim structure in accordance with claim 1 including a doubled back side flange of said rim which terminates short of the opposing wheel rim, said lip being dimensioned to extend into the space between the wheel rim and the end of the doubled back side flange.

3. The sealing flap in accordance with claim 2 wherein said projecting lip is provided around the entire circumference of said flap.

4. A sealing flap in accordance with claim 3 wherein said sealing flap portions, which are of substantial thickness, each includes at least one internal cavity.

5. A sealing flap in accordance with claim 4 wherein said cavity extends through an entire circumference of said flap.

6. The sealing flap in accordance with claim 1 wherein said flap is of arcuate cross section to be of a configuration projecting away from sealing relation with the opposed tire rim to provide a cavity between each arched side portion of said flap and the associated seating portion of the rim.

7. The sealing flap in accordance with claim 1 wherein each of said cavities extends continuously around the entire circumference between the flap and its opposed rim.

8. A wheel and rim assembly comprising a pair of laterally spaced tire bead retaining flanges and a central well, a flap of relatively thin cross section conformably fitted to the profile of the central well in said rim and including a pair of axially outwardly projecting lips extending on each of opposite sides of said flap, and two bead seat portions disposed one at each side of said flap in flanking relation with said central well and adapted to bear sealingly against said tire bead retaining flanges to provide a pair of bead seals at the outer annular surfaces thereof, said projecting lips being extended from said bead seats into sealing relation with said rim.

References Cited

FOREIGN PATENTS

| 187,816 | 2/1955 | Austria. |
| 991,853 | 6/1951 | France. |
| 1,002,210 | 2/1957 | Germany. |
| 243,659 | 12/1925 | Great Britain. |

ARTHUR L. LA POINT, *Primary Examiner.*

C. W. HAEFELE, *Assistant Examiner.*